US012557086B2

(12) United States Patent
Mu et al.

(10) Patent No.: US 12,557,086 B2
(45) Date of Patent: Feb. 17, 2026

(54) METHOD AND DEVICE FOR DETERMINING AND CONFIGURING INITIAL ACCESS BANDWIDTH PART AND STORAGE MEDIUM

(71) Applicant: Beijing Xiaomi Mobile Software Co., Ltd., Beijing (CN)

(72) Inventors: Qin Mu, Beijing (CN); Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 586 days.

(21) Appl. No.: 17/998,577

(22) PCT Filed: May 15, 2020

(86) PCT No.: PCT/CN2020/090706
§ 371 (c)(1),
(2) Date: Nov. 11, 2022

(87) PCT Pub. No.: WO2021/227088
PCT Pub. Date: Nov. 18, 2021

(65) Prior Publication Data
US 2023/0164758 A1 May 25, 2023

(51) Int. Cl.
*H04W 72/0457* (2023.01)
(52) U.S. Cl.
CPC .............. *H04W 72/0457* (2023.01)
(58) Field of Classification Search
None
See application file for complete search history.

(56) References Cited

U.S. PATENT DOCUMENTS

| 2018/0279310 A1* | 9/2018 | Chen | H04L 5/001 |
| 2021/0360510 A1* | 11/2021 | Zheng | H04L 5/0012 |
| 2022/0287102 A1* | 9/2022 | Futaki | H04W 74/0833 |

(Continued)

FOREIGN PATENT DOCUMENTS

| CN | 109803396 A | 5/2019 |
| CN | 110475361 A | 11/2019 |
| WO | WO 2021044598 A1 | 3/2021 |

OTHER PUBLICATIONS

Nokia, Nokia Shanghai Bell, "Corrections to BWP configuration", R2-1813770, 3GPP TSG-RAN WG2 Meeting #103-bis, R2-1813770, Chengdu, China, Oct. 8-12, 2018, 4 pages.

(Continued)

*Primary Examiner* — The Hy Nguyen
(74) *Attorney, Agent, or Firm* — Finnegan, Henderson, Farabow, Garrett & Dunner, L.L.P.

(57) ABSTRACT

A method for determining an initial access bandwidth part, includes: determining, by a first terminal, a first initial access bandwidth part based on a first rule, wherein the first initial access bandwidth part does not exceed an access bandwidth capability of the first terminal, the access bandwidth capability of the first terminal is lower than an access bandwidth capability of a second terminal, and the second terminal is a terminal that determines a second initial access bandwidth part based on a second rule according to remaining minimum system information (RMSI), and wherein the first rule and the second rule are not completely identical or are completely different.

11 Claims, 6 Drawing Sheets

(56) References Cited

U.S. PATENT DOCUMENTS

| | | | | |
|---|---|---|---|---|
| 2022/0330133 A1* | 10/2022 | Chen | ................. | H04W 36/0061 |
| 2022/0361122 A1* | 11/2022 | Zheng | ................... | H04L 5/0091 |
| 2023/0140310 A1* | 5/2023 | Koskinen | .............. | H04L 5/0064 |
| | | | | 370/329 |

OTHER PUBLICATIONS

Request for the Submission of an Opinion for Chinese Application No. 10-2022-7042033, dated Nov. 30, 2022, 14 pages.

International Search Report and Written Opinion of International Application No. PCT/CN2020/090706, mailed Jan. 27, 2021, 15 pages.

Notice of Reasons for Refusal for Japanese Patent Application No. 2022-569230, dated Dec. 5, 2023, 8 pages.

European Patent Office, Extended European Search Report issued in Application No. 20935552.8 dated Jan. 5, 2024, 68 pages.

Huawei, HiSilicon, "Remaining issues for option2 for 6-1 UEs", 3GPP TSG-RAN WG2 Meeting #103bis, R2-1813655, Chengdu, China, Oct. 8-12, 2018, 2 pages.

\* cited by examiner

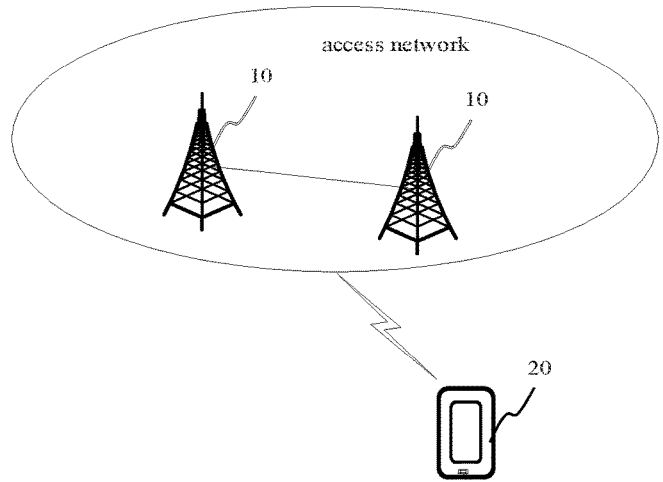

FIG. 1 the first terminal determines a first initial access bandwidth part based on a first rule. The first initial access bandwidth part does not exceed the access bandwidth capability of the first terminal. The access bandwidth capability of the first terminal is lower than the access bandwidth capability of the second terminal. The second terminal is a terminal that determines a second initial access bandwidth part based on a second rule according to remaining minimum system information (RMSI). The first rule and the second rule are not completely identical or are completely different

FIG. 2

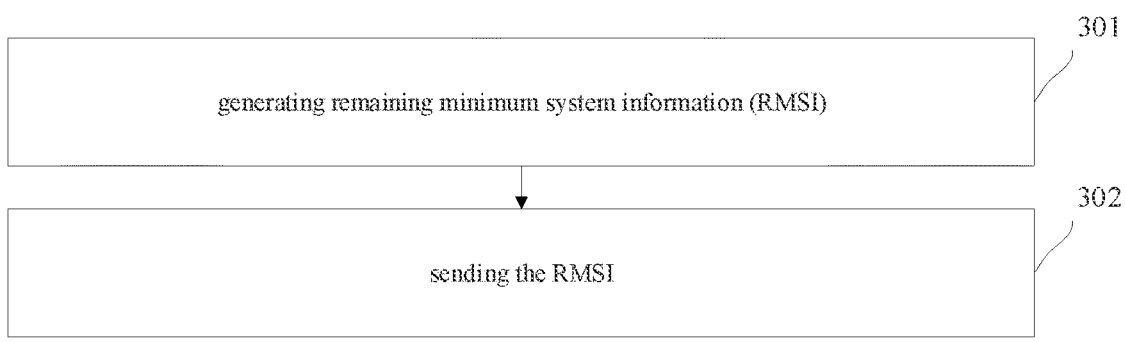

FIG. 3

METHOD AND DEVICE FOR DETERMINING AND CONFIGURING INITIAL ACCESS BANDWIDTH PART AND STORAGE MEDIUM

CROSS-REFERENCE TO RELATED APPLICATION

This application is the US national phase application of International Application No. PCT/CN2020/090706, filed on May 15, 2020, the entire contents of which are incorporated herein by reference.

TECHNICAL FIELD

The disclosure relates to the field of communication technologies, and in particular, to method and apparatuses for determining and configuration an initial access bandwidth part and a storage medium.

BACKGROUND

The initial access bandwidth part, also known as the initial bandwidth part, is mainly used for the initial access process of the terminal.

In related technologies, the access network device can carry the configuration information for configuring the initial access bandwidth part through the remaining minimum system information (RMSI). If the RMSI contains the configuration information, the terminal will determine the initial access bandwidth part according to the configuration information, If the RMSI does not contain this configuration information, the terminal will determine the initial access bandwidth part according to resources where the control resource set 0 (CORESET #0).

However, when some terminals with poor capabilities appear in the same communication system, the initial access bandwidth part configured by the access network device in the RMSI may exceed the capabilities of these terminals with poor capabilities, causing these terminals with poor capabilities to fail to work normally.

SUMMARY

According to a first aspect of the present disclosure, a method for determining an initial access bandwidth part is provided. The method includes:
  determining, by a first terminal, a first initial access bandwidth part based on a first rule, wherein the first initial access bandwidth part does not exceed an access bandwidth capability of the first terminal, the access bandwidth capability of the first terminal is lower than an access bandwidth capability of a second terminal, the second terminal is a terminal that determines a second initial access bandwidth part based on a second rule according to remaining minimum system information (RMSI), and wherein, the first rule and the second rule are not completely identical or are completely different.

According to a second aspect of the present disclosure, a method for configuring an initial access bandwidth part is provided. The method includes:
  generating remaining minimum system information (RMSI), wherein the RMSI includes first configuration information configured to indicate an initial access bandwidth part of a second terminal and second configuration information configured to indicate an initial access bandwidth part of a first terminal, and an access bandwidth capability of the first terminal is lower than an access bandwidth capability of the second terminal; sending the RMSI.

According to a third aspect of the present disclosure, a first terminal is provided. The first terminal includes: a processor; and a memory configured to store instructions executable by the processor, wherein the processor is configured to implement the method for determining an initial access bandwidth part described in the first aspect.

According to a fourth aspect of the present disclosure, an access network device is provided. The access network device includes: a processor; and a memory configured to store instructions executable by the processor, wherein the processor is configured to implement the method for configurating an initial access bandwidth part described in the second aspect by executing the instructions.

It should be understood that the above general description and the following detailed description are only illustrative and explanatory, and do not limit the disclosure.

BRIEF DESCRIPTION OF THE DRAWINGS

The drawings herein are incorporated into the specification and form a part of the specification, showing embodiments in accordance with the disclosure, and are used together with the specification to explain the principles of the disclosure.

FIG. 1 is an architectural diagram of a communication system according to an exemplary embodiment;

FIG. 2 is a flowchart of a method for determining an initial access bandwidth part according to an exemplary embodiment;

FIG. 3 is a flowchart of a method for configuring an initial access bandwidth part according to an exemplary embodiment;

DETAILED DESCRIPTION

Figure 4:
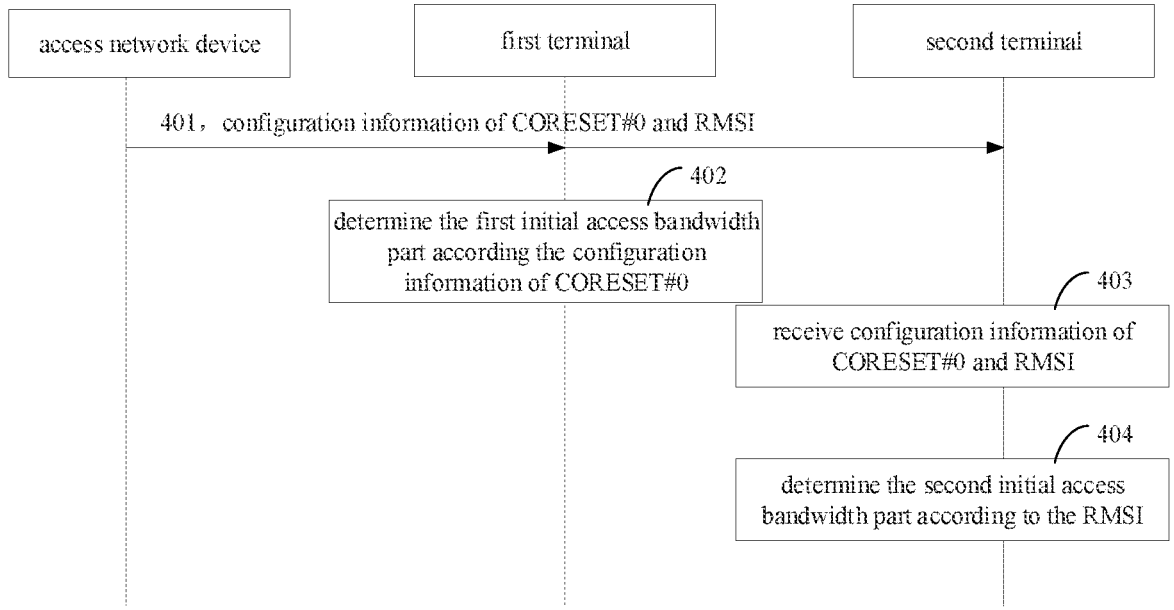
FIG. 4 is a flowchart of a method for determining an initial access bandwidth part according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in embodiments of the present disclosure are only for the purpose of describing particular embodiments, and are not intended to limit the embodiments of the present disclosure. As used in the embodiments of the present disclosure and the appended claims, the singular forms "a," "the," and "said" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various pieces of information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" as used herein can be interpreted as "in case of" or "when" or "in response to determining."

It should be understood that although the steps are described in the way of numbering for easy understanding in the embodiments of the present disclosure, these numbers do not represent the execution order of the steps, nor do they represent that the steps using sequential numbering must be executed together. It should be understood that one or more of the steps numbered sequentially can be executed separately to solve the corresponding technical problem and reach the predetermined technical solution. Even if a plurality of steps are exemplary listed together in the drawings, it does not mean that these steps must be performed together. The accompanying drawings list these steps in an exemplary manner for ease of understanding.

Please refer to FIG. 1, which shows a schematic diagram of a mobile communication system provided by an embodiment of the present disclosure. As shown in FIG. 1, the mobile communication system may include a network access device 10 and a terminal 20.

The access network device 10 is deployed in the wireless access network to provide wireless access function for the terminal 20. The access network device may be a base station (BS). The access network device 10 may perform wireless communication with the terminal 20 via one or more antennas. The access network device 10 may provide communication coverage for the geographic region in which it is located. The base station may include macro base station, micro base station, relay station, access point and other different types. In some embodiments, the base station may be called a base station transceiver, a wireless base station, an access point, a wireless transceiver, a basic service set (BSS), an extended service set (ESS), a NodeB, an evolved NodeB (eNB or eNodeB), or some other appropriate terminology by those skilled in the art. For example, in a 5G system, the base station is referred to as gNB. For the convenience of description, in embodiments of the disclosure, the above devices that provide wireless communication functions for the terminal 20 are collectively referred to as access network device.

The terminals 20 may be distributed throughout the mobile communication system, and each terminal 20 may be stationary or mobile. The terminal 20 may also be referred to by those skilled in the art as a mobile station, a user station, a mobile unit, a user unit, a wireless unit, a remote unit, a mobile device, a user equipment, a wireless device, a wireless communication device, a remote device, a mobile user station, an access terminal, a mobile terminal, a wireless terminal, a remote terminal, a handheld device, a user agent, a mobile client, a client, or some other appropriate terminology. The terminal 20 may be a cellular telephone, a personal digital assistant (PDA), a wireless modem, a wireless communication device, a handheld device, a tablet computer, a laptop computer, a cordless telephone, a wireless local loop (WLL) station, etc. The terminal 20 can communicate with the access network device 10 in the mobile communication system.

The access network device 10 and the terminal 20 can communicate with each other through the air interface technology, for example, through the cellular technology. The communication link between the access network device 10 and the terminal 20 may include: downlink (DL) transmission from the access network device 10 to the terminal 20, and/or uplink (UP) transmission from the terminal 20 to the access network device 10. Downlink transmission may also be referred to as forward link transmission, and uplink transmission may also be referred to as reverse link transmission. In some examples, downlink transmission may include transmission of a discovery signal, which may include a reference signal and/or a synchronization signal.

The mobile communication system shown in FIG. 1 above may be a Long Term Evolution (LTE) system, or a next generation evolution system based on LTE system, such as LTE-A (LTE Advanced) system, the 5th Generation (5G) system (also known as NR system), or a next generation evolution system based on 5G system, and so on. In embodiments of the disclosure, the terms "system" and "network" are often used interchangeably, but those skilled in the art can understand their meanings.

The communication system and business scenarios described in embodiments of the present disclosure are intended to more clearly explain the technical solutions of the embodiments of the present disclosure, and do not constitute a limitation on the technical solutions provided by the embodiments of the present disclosure. As ordinary technicians in the art can see, with the evolution of the communication system and the emergence of new business scenarios, the technical solutions provided by the embodiments of the present disclosure are also applicable to similar technical problems.

In the communication system shown in FIG. 1, the terminal needs to use the synchronization signal block (synchronization signal and PBCH Block, SSB) to complete the initial access.

In the time domain, one SSB occupies four symbols (i.e., orthogonal frequency division multiplexing (OFDM) symbols), including the primary synchronized signal (PSS) of one symbol, the secondary synchronized signal (SSS) of one symbol, and the physical broadcast channel (PBCH) of two symbols. Within SSB, symbols are numbered from 0 to 3 in increasing order. In the frequency domain, one SSB occupies 24 consecutive resource blocks (RBs). Each RB includes 12 subcarriers. The subcarriers in the above 24 RBs are numbered from 0 to 287 in increasing order, starting with the RB with the lowest number. For PSS and SSS, resources are mapped to the 127th subcarrier in the middle. For PBCH, resources are mapped to the 288th subcarrier. PSS, SSS, and PBCH have the same cyclic prefix (CP) length and subcarrier spacing. The subcarrier spacing can be configured as 15 kHz, 30 kHz, 120 kHz and 240 kHz.

In the initial access process, the terminal will first detect the received synchronization signal block, acquire the Master Information Block (MIB) in the SSB, and acquire from the MIB, the configuration information of the search space (SS) and the control resource set 0 (CORESET #0) of physical downlink control channel (PDCCH) of the terminal monitoring and scheduling other system information (such as system information block 1, SIB1, RMSI). According to the indication of MIB, the terminal can determine the frequency offset of CORESET #0 relative to the synchronization signal block, and the size of frequency resources occupied by CORESET #0, that is, the number of RBs.

In order to meet the requirements of different communication services, there are two types of terminals in the communication system shown in FIG. 1, namely the first terminal and the second terminal. The capabilities of the two terminals may be different. For example, the bandwidth of the initial access bandwidth part supported by the second terminal is greater than the bandwidth of the initial access bandwidth part supported by the first terminal, that is, the access bandwidth capability of the second terminal exceeds the access bandwidth capability of the first terminal.

In embodiments of the present disclosure, the first terminal may also be called a reduced capability NR device, a reduced capability UE, a capability restricted UE, or a new radio simplified device (NR-lite). For example, the first terminal may be some sensors in the industrial Internet of Things, wireless video monitoring devices in smart cities, and wearable devices such as bracelets, watches, health and medical monitoring devices. The second terminal also be called a normal device, such as a mobile terminal.

FIG. 2 is a flowchart of a method for determining an initial access bandwidth part according to an exemplary embodiment. The method can be executed by the first terminal, as shown in FIG. 2, the method includes the following steps.

In step 201, the first terminal determines a first initial access bandwidth part based on a first rule. The first initial access bandwidth part does not exceed the access bandwidth capability of the first terminal. The access bandwidth capability of the first terminal is lower than the access bandwidth capability of the second terminal. The second terminal is a terminal that determines a second initial access bandwidth part based on a second rule according to remaining minimum system information (RMSI). The first rule and the second rule are not completely identical or are completely different.

Optionally, determining by the first terminal the first initial access bandwidth part based on the first rule, includes:
  determining the first initial access bandwidth part according to the configuration information of the control resource set 0.

Optionally, determining by the first terminal the first initial access bandwidth part based on the first rule, includes:
  determining the first initial access bandwidth part according to the second configuration information in the RMSI, in which the second configuration information is configured to indicate the initial access bandwidth part of the second terminal.

Optionally, determining by the first terminal the first initial access bandwidth part based on the first rule, includes:
  in response to the RMSI including the second configuration information, determining the first initial access bandwidth part according to the second configuration information in the RMSI, in which the second configuration information is configured to indicate the initial access bandwidth part of the second terminal;
  or,
  in response to the RMSI including no second configuration information, determining the first initial access bandwidth part according to the configuration information of the control resource set 0.

Optionally, determining by the first terminal the first initial access bandwidth part based on the first rule, includes:
  determining the second initial access bandwidth part according to the first configuration information;
  determining a part of a bandwidth of the second initial access bandwidth part as the first initial access bandwidth part according to the access bandwidth capability of the first terminal.

Optionally, determining by the first terminal the first initial access bandwidth part based on the first rule, includes:
  determining the second initial access bandwidth part according to the first configuration information;
  determining the first initial access bandwidth part according to the size relationship between the second initial access bandwidth part and the access bandwidth capability of the first terminal.

Optionally, determining by the first terminal the first initial access bandwidth part based on the first rule, includes:
  if the second initial access bandwidth part exceeds the access bandwidth capability of the first terminal, performing any of the following steps:
  determining the first initial access bandwidth part according to the configuration information of the control resource set 0;
  determining the first initial access bandwidth part according to the second configuration information in the RMSI, in which the second configuration information is configured to indicate the initial access bandwidth part of the second terminal; or
  determining a part of the bandwidth of the second initial access bandwidth part as the first initial access bandwidth part according to the access bandwidth capability of the first terminal.

Optionally, determining by the first terminal the first initial access bandwidth part based on the first rule, includes:
  If the second initial access bandwidth part does not exceed the access bandwidth capability of the first terminal, determining the second initial access bandwidth part as the first initial access bandwidth part.

Optionally, determining the first initial access bandwidth part according to the configuration information of the control resource set 0, includes:
  determining a frequency resource where the control resource set 0 is located as the first initial access bandwidth part; or
  determining a starting frequency position of the frequency resource where the control resource set 0 is located as a starting position of the first initial access bandwidth part, and determining an end position of the first initial access bandwidth part by taking the access bandwidth capability of the first terminal as an offset to the starting frequency position.

Optionally, determining a part of the bandwidth of the second initial access bandwidth part as the first initial access bandwidth part according to the access bandwidth capability of the first terminal, includes:
  determining the starting frequency position of the second initial access bandwidth part as the starting position of the first initial access bandwidth part, and determining an end position of the first initial access bandwidth part by taking the access bandwidth capability of the first terminal as the offset to the starting frequency position.

It is worth noting that the above step 201 and the above optional steps can be arbitrarily combined.

FIG. 3 is a flowchart of a method for configuring an initial access bandwidth part according to an exemplary embodiment. This method can be executed by the aforementioned access network device, as shown in FIG. 3, the method includes the following steps.

In step 301, remaining minimum system information (RMSI) is generated. The RMSI includes first configuration information configured to indicate an initial access bandwidth part of a second terminal and second configuration information configured to indicate an initial access bandwidth part of a first terminal. An access bandwidth capability of the first terminal is lower than an access bandwidth capability of the second terminal.

In step 302, the RMSI is sent.

FIG. 4 is a flowchart of a method for determining an initial access bandwidth part according to an exemplary embodiment. This method can be jointly implemented by the access network device and the terminals in FIG. 1. In the embodiment shown in FIG. 4, the terminals include the first terminal and the second terminal. The access bandwidth capability of the first terminal is lower than that of the second terminal. As shown in FIG. 4, the method includes the following steps.

In step 401, the access network device sends RMSI and configuration information of CORESET #0.

The configuration information of CORESET #0 is configured to indicate the frequency resource where CORESET #0 is located. By way of example, the configuration information of CORESET #0 may include information such as the starting frequency position and the width in the frequency domain.

The terminal may obtain PDCCH for scheduling system information (such as SIB1, RMSI, etc.) according to the configuration information of CORESET #0.

After acquiring the PDCCH associated with the RMSI, the terminal acquires the physical downlink shared channel (PDSCH) corresponding to the PDCCH, and parses the RMSI from the PDSCH data.

In one possible implementation, the RMSI includes first configuration information configured to indicate the initial access bandwidth part of the second terminal. In another possible implementation, the RMSI does not include the first configuration information.

In step 402, the first terminal determines the first initial access bandwidth part according to the configuration information of CORESET #0.

In one possible implementation, step 402 includes determining the frequency resource where CORESET #0 is located as the first initial access bandwidth part. That is, the frequency size and frequency bandwidth occupied by CORESET #0 are determined as the first initial access bandwidth part.

In another possible implementation, step 402 includes: determining the starting frequency position of the frequency resource where CORESET #0 is located as the starting position of the first initial access bandwidth part, and determining the end position of the first initial access bandwidth part by taking the access bandwidth capability of the first terminal as the offset to the starting frequency position.

In step 403, the second terminal receives RMSI and the configuration information of CORESET #0.

In step 404, the second terminal determines the second initial access bandwidth part according to the RMSI.

In this step 404, if the RMSI includes the first configuration information, the initial access bandwidth part indicated by the first configuration information is used as the second initial access bandwidth part. Or, if the RMSI does not include the first configuration information, the second initial access bandwidth part is determined according to the configuration information of CORESET #0. That is, the frequency resource where the control resource set 0 is located is determined as the second initial access bandwidth part.

For example, the method shown in FIG. 4 can be used to determine the initial downlink access bandwidth part. That is, both the first initial access bandwidth part and the second initial access bandwidth part are the initial downlink access bandwidth part.

It should be noted that in the method shown in FIG. 4, the first rule is to determine the first initial access bandwidth part only according to the configuration information of CORESET #0 (see step 402). The second rule is: if the RMSI includes the first configuration information, the initial access bandwidth part indicated by the first configuration information is taken as the second initial access bandwidth part; if the RMSI does not include the first configuration information, the second initial access bandwidth part is determined according to the configuration information of CORESET #0 (see step 404). That is, the first rule and the second rule are not completely identical.

In embodiments of the disclosure, regardless whether or not the RMSI contains the first configuration information, and regardless whether or not the initial access bandwidth part indicated by the first configuration information exceeds the access bandwidth capability of the first terminal, the first terminal determines the first initial access bandwidth part according to the configuration information of CORESET #0. Since the frequency resource where CORESET #0 is located is small, the first initial bandwidth part determined according to the configuration information of CORESET #0 will not exceed the access bandwidth capacity of the first terminal, which is conducive to the normal operation of the first terminal.

Figure 5:
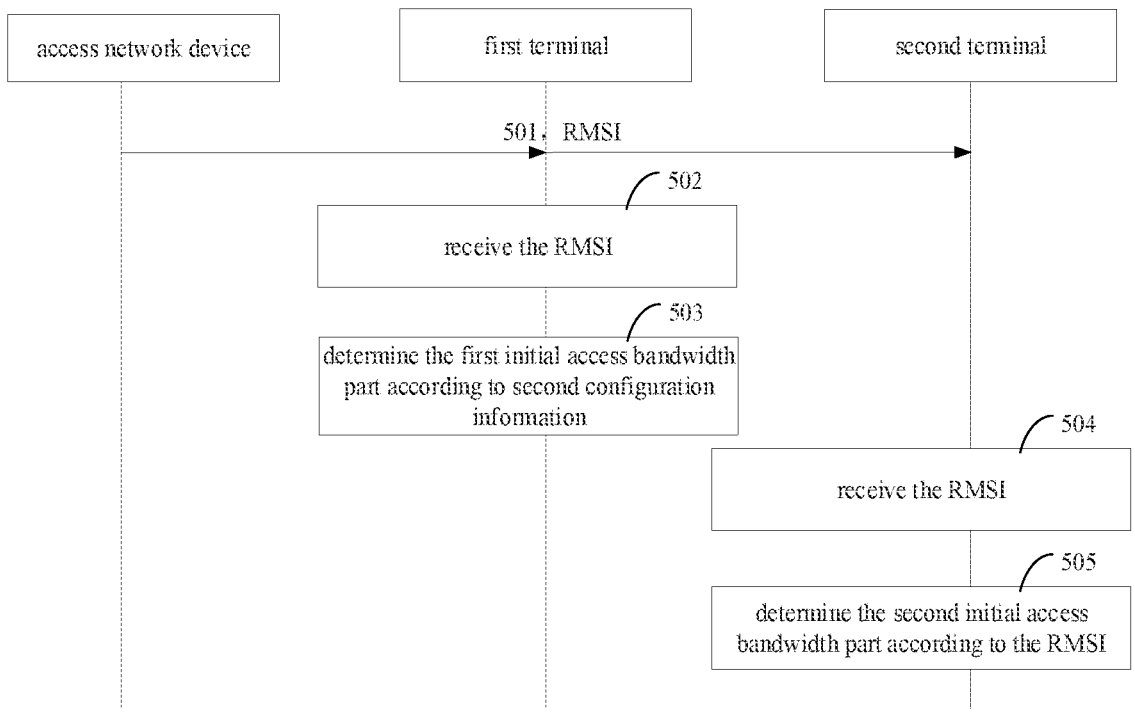
FIG. 5 is a flowchart of a method for determining an initial access bandwidth part according to an exemplary embodiment.

FIG. 5 is a flowchart of a method for determining an initial access bandwidth part according to an exemplary embodiment. This method can be jointly implemented by the aforementioned access network device and terminals. In the embodiment shown in FIG. 5, the terminals include a first terminal and a second terminal. The access bandwidth capacity of the first terminal is lower than that of the second terminal. As shown in FIG. 5, the method includes the following steps.

In step 501, the access network device sends RMSI.

In one possible implementation, the RMSI includes first configuration information configured to indicate the initial access bandwidth part of the second terminal and second configuration information configured to indicate the initial access bandwidth part of the first terminal. In another possible implementation, the RMSI includes the second configuration information and does not include the first configuration information.

In order to ensure that the first initial access bandwidth part determined by the first terminal does not exceed the access bandwidth capability of the first terminal, the initial access bandwidth part indicated by the second configuration information does not exceed the access bandwidth capability of the first terminal.

For example, when the RMSI includes both the first configuration information and the second configuration information, the initial access bandwidth part indicated by the second configuration information is smaller than the initial access bandwidth part indicated by the first configuration information.

In step 502, the first terminal receives the RMSI.

In step 503, the first terminal determines the first initial access bandwidth part according to the second configuration information.

That is, the initial access bandwidth portion indicated by the second configuration information is taken as the first initial access bandwidth part.

In step 504, the second terminal receives the RMSI.

In step 505, the second terminal determines the second initial access bandwidth part according to the RMSI.

For the relevant contents of step 505, reference can be made to the above step 404, and detailed description is omitted here.

For example, the method shown in FIG. 5 can be used to determine the initial downlink access bandwidth part or the initial uplink access bandwidth part. That is, both the first initial access bandwidth part and the second initial access bandwidth part are the initial downlink access bandwidth part, or both are the initial uplink access bandwidth part.

It should be noted that in the method shown in FIG. 5, the first rule is to determine the first initial access bandwidth part according to the second configuration information (see step 503). The second rule is: if the RMSI includes the first configuration information, the initial access bandwidth part indicated by the first configuration information is taken as the second initial access bandwidth part; if the first configuration information is not included in the RMSI, the second initial access bandwidth part is determined according to the configuration information of CORESET #0 (see step 404). That is, the first rule is completely different from the second rule.

In the embodiment of the present disclosure, for the first terminal with poor access bandwidth capability, the second configuration information is separately set to ensure that the first initial access bandwidth part determined by the first terminal according to the second configuration information does not exceed the access bandwidth capability of the first terminal, which is conducive to the normal operation of the first terminal.

Figure 6:
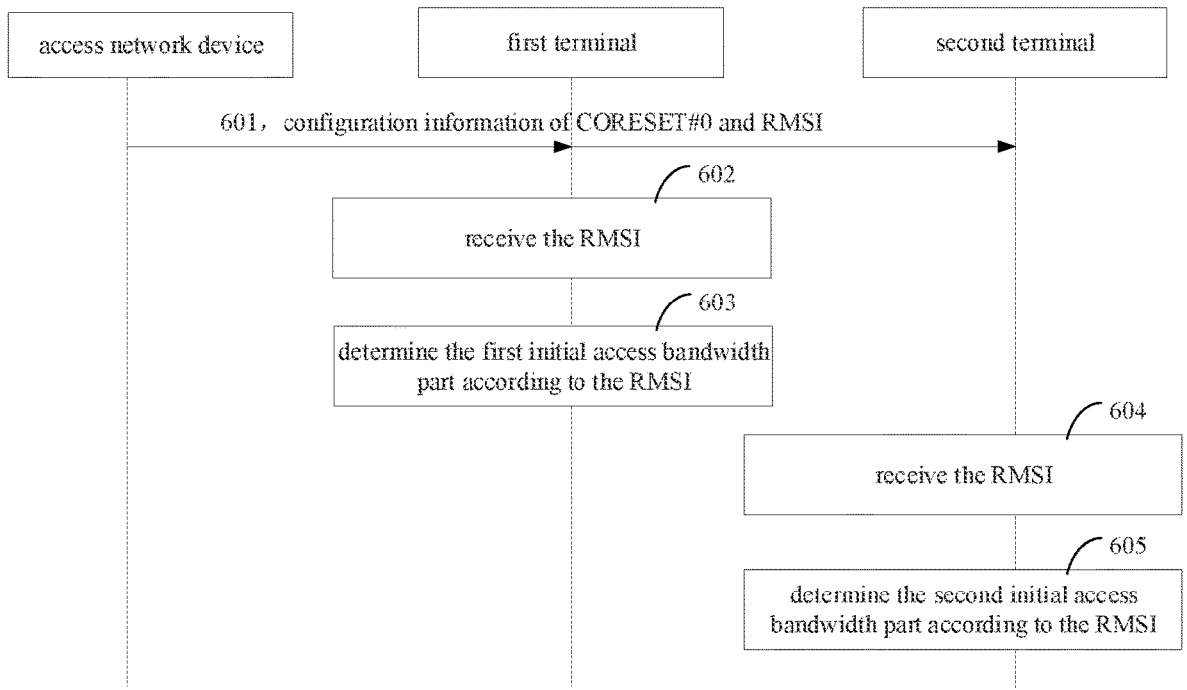
FIG. 6 is a flowchart of a method for determining an initial access bandwidth part according to an exemplary embodiment.

FIG. 6 is a flowchart of a method for determining an initial access bandwidth part according to an exemplary embodiment. This method can be jointly implemented by the aforementioned access network device and terminals. In the embodiment shown in FIG. 6, the terminals include a first terminal and a second terminal. The access bandwidth capacity of the first terminal is lower than that of the second terminal. As shown in FIG. 6, the method includes the following steps.

In step 601, the access network device sends configuration information of CORESET #0 and RMSI.

In one possible implementation, the RMSI includes at least one of the first configuration information configured to indicate the initial access bandwidth part of the second terminal and second configuration information configured to indicate the initial access bandwidth part of the first terminal. In another possible implementation the RMSI includes neither the first configuration information nor the second configuration information. That is to say, the access network device can configure the first configuration information in RMSI or not. Similarly, the access network device can configure the second configuration information in RMSI or not.

In step 602, the first terminal receives the RMSI.

In step 603, the first terminal determines the first initial access bandwidth part according to the RMSI.

This step 603 may include: if the second configuration information in the RMSI is not missing (that is, the RMSI includes the second configuration information), determining the first initial access bandwidth part according to the second configuration information in the RMSI; or, if the second configuration information in the RMSI is missing (that is, the RMSI does not include the second configuration information), determining the first initial access bandwidth part according to the configuration information of CORESET #0.

Here, for the method of determining the first initial access bandwidth part according to the second configuration information in RMSI, reference can be made to step 503; for the method for determining the first initial access bandwidth part according to the configuration information of CORESET #0, reference can be made to step 402, and detailed description will be omitted here.

In step 604, the second terminal receives the RMSI.

In step 605, the second terminal determines the second initial access bandwidth part according to the RMSI.

For the relevant contents of step 605, reference can be made to the above step 404, and detailed description is omitted here.

Optionally, the method shown in FIG. 6 can be used to determine the initial downlink access bandwidth part. That is, both the first initial access bandwidth part and the second initial access bandwidth part are the initial downlink access bandwidth part.

It should be noted that in the method shown in FIG. 6, the first rule is to determine the first initial access bandwidth part according to the second configuration information (see step 603). The second rule is: if the RMSI includes the first configuration information, the initial access bandwidth part indicated by the first configuration information is taken as the second initial access bandwidth part; if the first configuration information is not included in the RMSI, the second initial access bandwidth part is determined according to the configuration information of CORESET #0. That is, the first rule is completely different from the second rule.

In the embodiment of the disclosure, the second configuration information is separately set for the first terminal with poor access bandwidth capability. When the RMSI includes the second configuration information, the first initial access bandwidth part determined by the first terminal according to the second configuration information does not exceed the access bandwidth capability of the first terminal. When the RMSI does not include the second configuration information, the first terminal determines the first initial access bandwidth part according to the configuration information of CORESET #0. Since the frequency resource of CORESET #0 is small, the first initial bandwidth part determined according to the configuration information of CORESET #0 will not exceed the access bandwidth capacity of the first terminal. Therefore, it can be ensured that the first initial access bandwidth part determined by the first terminal will not exceed the access bandwidth capacity of the first terminal, thus facilitating the normal operation of the first terminal.

Figure 7:
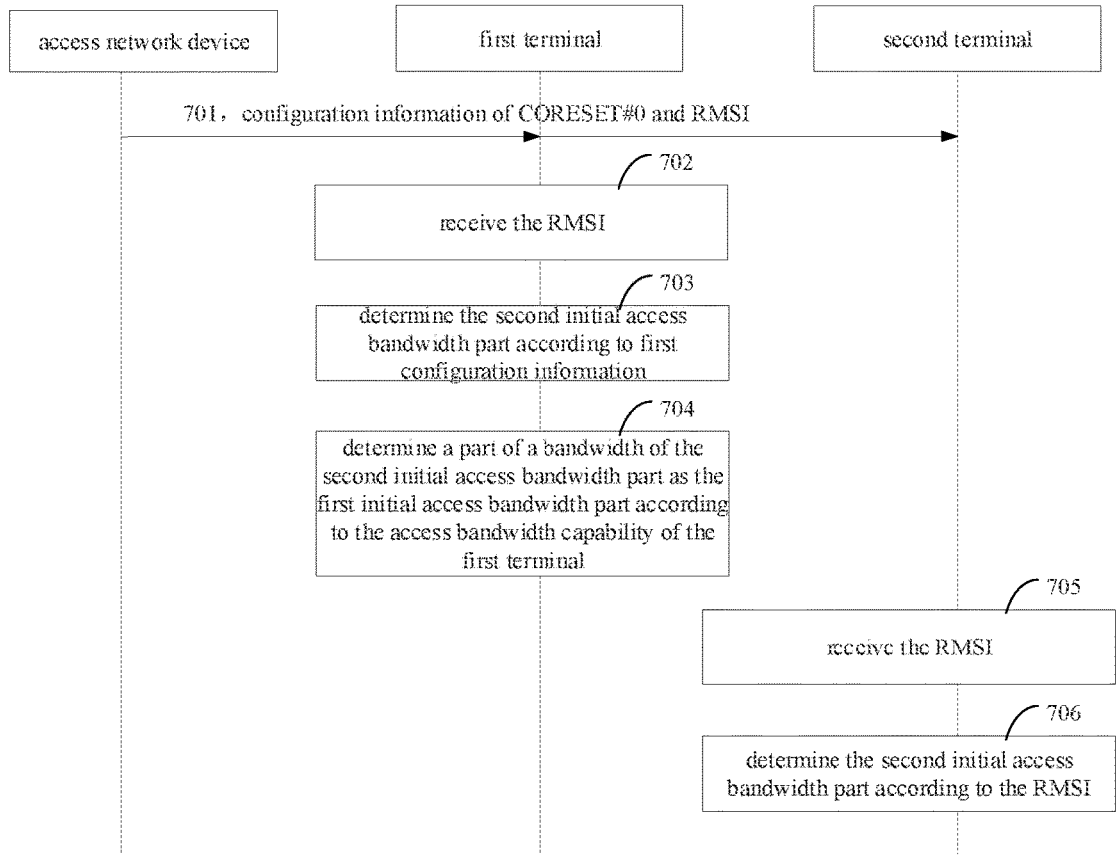
FIG. 7 is a flowchart of a method for determining an initial access bandwidth part according to an exemplary embodiment.

FIG. 7 is a flowchart of a method for determining an initial access bandwidth part according to an exemplary embodiment. This method can be jointly implemented by the aforementioned access network device and terminals. In the embodiment shown in FIG. 7, the terminals include a first terminal and a second terminal. The access bandwidth capacity of the first terminal is lower than that of the second terminal. As shown in FIG. 7, the method includes the following steps.

In step 701, the access network device sends the configuration information of CORESET #0 and RMSI.

In step 702, the first terminal receives the RMSI.

In step 703, the first terminal determines the second initial access bandwidth part according to the first configuration information;

In step 704, the first terminal determines a part of a bandwidth of the second initial access bandwidth part as the first initial access bandwidth part according to the access bandwidth capability of the first terminal.

For example, step 704 may include as follows. The first terminal takes the starting frequency position of the second initial access bandwidth part as the starting position of the first initial access bandwidth part, and determines the end position of the first initial access bandwidth part by taking the access bandwidth capability of the first terminal as the offset to the starting frequency position.

In step 705, the second terminal receives the RMSI.

In step 706, the second terminal determines the second initial access bandwidth part according to the RMSI.

Optionally, the method shown in FIG. 7 can be used to determine the initial downlink access bandwidth part or the initial uplink access bandwidth part. That is, both the first initial access bandwidth part and the second initial access bandwidth part are the initial downlink access bandwidth part, or both are the initial uplink access bandwidth part.

When the second initial access bandwidth part is the initial downlink access bandwidth part, this step 706 can refer to the above step 404.

When the second initial access bandwidth part is the initial uplink access bandwidth part, this step 706 can include: taking the initial access bandwidth part indicated by the first configuration information in the RMSI as the second initial access bandwidth part.

It should be noted that in the method shown in FIG. 7, the first rule is to determine the first initial access bandwidth part according to the second configuration information (see steps 703 and 704). See step 706 for the second rule. That is, the first rule is completely different from the second rule.

In the embodiment of the present disclosure, for the first terminal with poor access bandwidth capability, a part of the bandwidth of the second initial access bandwidth part is determined as the first initial access bandwidth part according to the access bandwidth capability of the first terminal, so that when the second initial access bandwidth part is greater than the access bandwidth capability of the first terminal, the first initial access bandwidth part determined by the first terminal will not exceed the access bandwidth capacity of the first terminal, which is conducive to the normal operation of the first terminal.

Figure 8:
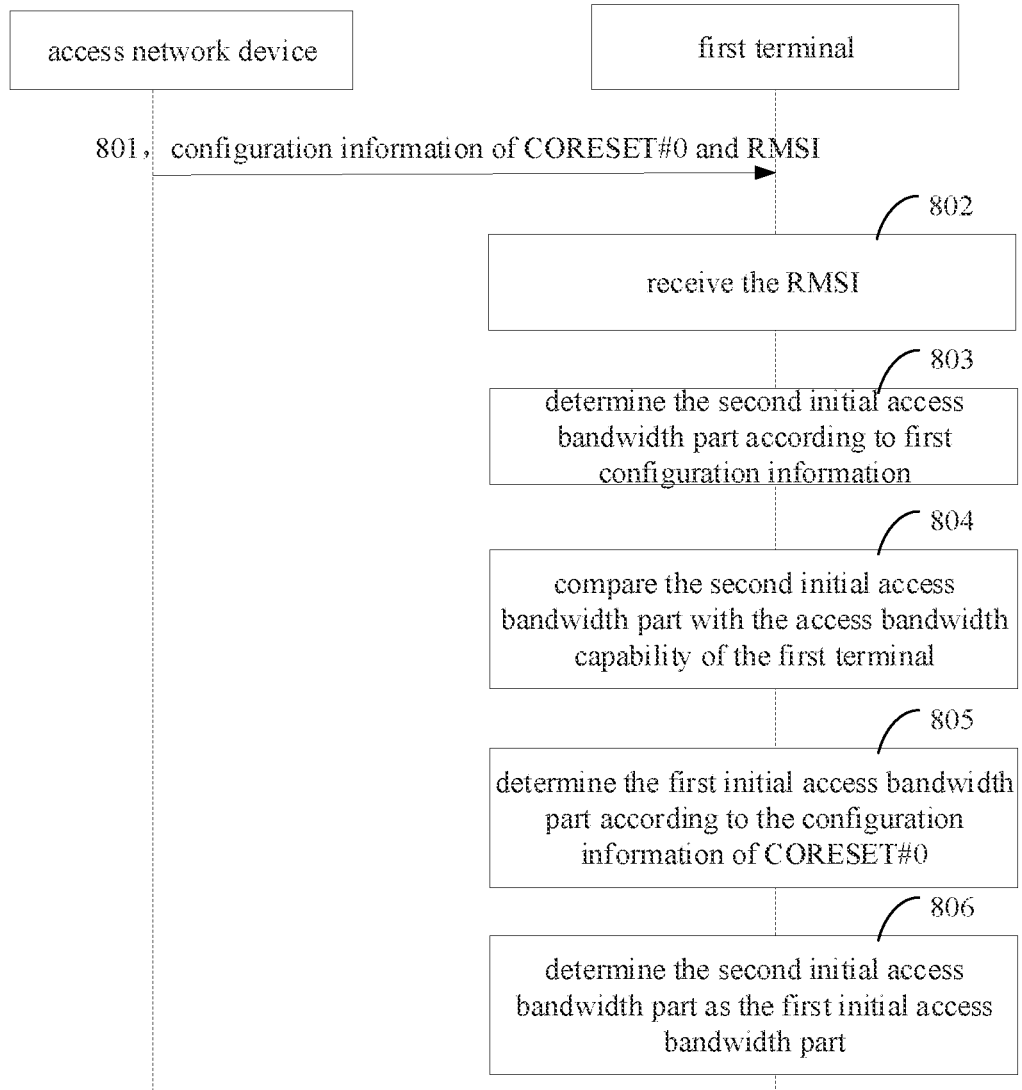
FIG. 8 is a flowchart of a method for determining an initial access bandwidth part according to an exemplary embodiment.

FIG. 8 is a flowchart of a method for determining an initial access bandwidth part according to an exemplary embodiment. This method can be jointly implemented by the aforementioned access network device and terminals. In the embodiment shown in FIG. 8, the terminals include a first terminal and a second terminal. The access bandwidth capacity of the first terminal is lower than that of the second terminal. As shown in FIG. 8, the method includes the following steps.

In step 801, the access network device sends the configuration information of CORESET #0 and RMSI.

In step 802, the first terminal receives the RMSI.

In step 803, the first terminal determines the second initial access bandwidth part according to the first configuration information.

In step 804, the first terminal compares the second initial access bandwidth part with the access bandwidth capability of the first terminal.

If the second initial access bandwidth part exceeds the access bandwidth capability of the first terminal, step 805 is executed; if the second initial access bandwidth part does not exceed the access bandwidth capability of the first terminal, step 806 is executed.

In step 805, the first terminal determines the first initial access bandwidth part according to the configuration information of CORESET #0.

Refer to the above step 402 for relevant contents of step 805.

In some embodiments of the present disclosure, step 805 may be replaced by the above step 503, or the above step 603, or the above steps 703 and 704.

It should be noted that when step 805 is replaced by step 503 or steps 703 and 704, the first initial access bandwidth part may be the initial uplink access bandwidth part or the initial downlink access bandwidth part; when this step 805 is replaced by the above step 603, the first initial access bandwidth part is the initial downlink access bandwidth part.

In step 806, the first terminal takes the second initial access bandwidth part as the first initial access bandwidth part.

It can be realized through steps 803 to 806 that, the first initial access bandwidth part is determined according to the size relationship between the second initial access bandwidth part and the access bandwidth capability of the first terminal.

In this embodiment, for the method for the second terminal to determine the second initial access bandwidth part, reference can be made to the above step 404, and will not be repeated here.

It should be noted that in the method shown in FIG. 8, the first rule is shown in steps 803 to 806, and the second rule is shown in step 404. That is, the first rule is completely different from the second rule.

Determining the initial downlink bandwidth part (initial DL BWP) and initial uplink bandwidth part (initial UL BWP) will be illustrated respectively below.

1. Determining Initial DL BWP

When the initial DL BWP configured by RMSI is not greater than the access bandwidth capacity of the first terminal, the first terminal sets the initial DL BWP according to the configuration in RMSI:

When the initial DL BWP configured by RMSI is greater than the access bandwidth capability of the first terminal, one of the following three ways is used to determine the initial DL BWP:

Way 1: the first terminal determines the initial DL BWP according to the predefined rule 1 or 2.

Predefined rule 1: the frequency size and frequency bandwidth occupied by CORESET #0 is set as the user's initial DL BWP;

Predefined rule 2: the starting frequency position of CORESET #0 is taken as the starting point, and the end point of initial DL BWP is determined according to the bandwidth capacity of the first terminal.

Way 2: the access network device additionally configures an Initial DL BWP_extra (that is, the second configuration information) for the first terminal (also known as NR-lite) in the RMSI, and the first terminal takes the Initial DL BWP_extra as the initial DL BWP.

Way 3 (Combination of way 1 and way 2): the access network device can additionally configure Initial DL BWP_extra in RMSI, but the access network device can also not configure Initial DL BWP_extra. When the access network device does not configure Initial DL BWP_extra, the first way is used to determine the initial DL BWP. When the access network device configures Initial DL BWP_extra, the second way is used to determine the initial DL BWP.

2. Determining Initial UL BWP

When the initial UL BWP configured by RMSI is not greater than the access bandwidth capacity of the first terminal, the first terminal sets the initial UL BWP according to the configuration in RMSI. When the initial UL BWP configured by RMSI is greater than the access bandwidth capability of the first terminal, any of the following three ways is used to determine the initial UL BWP.

Way 1: initial UL BWP is determined according to a predefined rule

Predefined rule: the starting frequency position of initial UL BWP configured by RMSI is the starting point, and the end point of initial UL BWP is determined according to the access bandwidth capability of the first terminal.

Way 2: the access network device additionally configures an Initial UL BWP_extra (that is, the second configuration information) for the first terminal (also known as NR-lite) in the RMSI, and the first terminal takes the Initial UL BWP_extra as the initial DL BWP.

Way 3 (Combination of way 1 and way 2): the access network device can additionally configure Initial UL BWP_extra in RMSI, but the access network device can also not configure Initial UL BWP_extra. When the access network device does not configure Initial UL BWP_extra, the first way is used to determine the initial UL BWP. When the access network device configures Initial UL BWP_extra, the second way is used to determine the initial UL BWP.

In embodiments of the present disclosure, for the first terminal with poor access bandwidth capability, when the initial access bandwidth part (i.e. the second initial access bandwidth part) indicated by the first configuration information exceeds the initial access bandwidth capability of the first terminal, the first initial access bandwidth part is determined according to the configuration information of CORESET #0, or the first initial access bandwidth part is determined through the second configuration information, and a part of the bandwidth of the second initial access bandwidth part is determined as the first initial access bandwidth part according to the access bandwidth capability of the first terminal, so that when the second initial access bandwidth part is greater than the access bandwidth capability of the first terminal, the first initial access bandwidth part determined by the first terminal will never exceed the access bandwidth capability of the first terminal, which is conducive to the normal operation of the first terminal.

The following is the apparatus embodiments of the disclosure. For details not described in detail in the apparatus embodiments, reference can be made to the above method embodiments.

Figure 9:
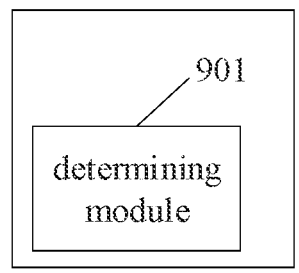
FIG. 9 is a block diagram of an apparatus for determining an initial access bandwidth part according to an exemplary embodiment.

FIG. 9 is a block diagram of an apparatus for determining an initial access bandwidth part according to an exemplary embodiment. The apparatus has a function to implement the above method example. The function can be implemented by hardware or by hardware executing corresponding software. Referring to FIG. 9, the apparatus for determining the initial access bandwidth part includes a determining module 901.

The determining module 901 is configured to determine a first initial access bandwidth part based on a first rule, wherein the first initial access bandwidth part does not exceed an access bandwidth capability of the first terminal, the access bandwidth capability of the first terminal is lower than an access bandwidth capability of a second terminal, the second terminal is a terminal that determines a second initial access bandwidth part based on a second rule according to remaining minimum system information (RMSI), and wherein, the first rule and the second rule are not completely identical or are completely different.

Optionally, the determining module 901 is configured to determine the first initial access bandwidth part according to configuration information of a control resource set 0.

Optionally, the determining module 901 is configured to determine the first initial access bandwidth part according to second configuration information in the RMSI, wherein the second configuration information is configured to indicate an initial access bandwidth part of the second terminal.

Optionally, the determining module 901 is configured to: determine the first initial access bandwidth part according to second configuration information in the RMSI in response to the RMSI including the second configuration information, wherein the second configuration information is configured to indicate an initial access bandwidth part of the second terminal;
or,
the determining module 901 is configured to determine the first initial access bandwidth part according to configuration information of a control resource set 0 in response to the RMSI including no second configuration information.

Optionally, the determining module 901 is configured to: determine the second initial access bandwidth part according to first configuration information: determine a part of a bandwidth of the second initial access bandwidth part as the first initial access bandwidth part according to the access bandwidth capability of the first terminal.

Optionally, the determining module 901 is configured to: determine the second initial access bandwidth part according to first configuration information; determine the first initial access bandwidth part according to a size relationship between the second initial access bandwidth part and the access bandwidth capability of the first terminal.

Optionally, the determining module 901 is configured to perform any of the following steps in response to the second initial access bandwidth part exceeding the access bandwidth capability of the first terminal:
determining the first initial access bandwidth part according to configuration information of a control resource set 0;
determining the first initial access bandwidth part according to second configuration information in the RMSI, wherein the second configuration information is configured to indicate an initial access bandwidth part of the second terminal; or
determining a part of a bandwidth of the second initial access bandwidth part as the first initial access bandwidth part according to the access bandwidth capability of the first terminal,
or,
the determining module 901 is configured to determine the second initial access bandwidth part as the first initial access bandwidth part in response to the second initial access bandwidth part not exceeding the access bandwidth capability of the first terminal.

Optionally, the determining module 901 is configured to determine a frequency resource where the control resource set 0 is located as the first initial access bandwidth part; or the determining module 901 is configured to determine a starting frequency position of the frequency resource where the control resource set 0 is located as a starting position of the first initial access bandwidth part, and determine an end position of the first initial access bandwidth part by taking the access bandwidth capability of the first terminal as an offset to the starting frequency position.

Optionally, the determining module 901 is configured to determine a starting frequency position of the second initial access bandwidth part as a starting position of the first initial access bandwidth part, and determine an end position of the first initial access bandwidth part by taking the access bandwidth capability of the first terminal as an offset to the starting frequency position.

Figure 10:
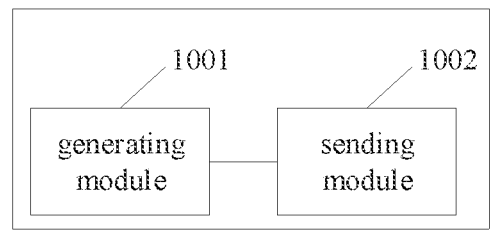
FIG. 10 is a block diagram of an apparatus for determining an initial access bandwidth part according to an exemplary embodiment.

FIG. 10 is a block diagram of an apparatus for configuring an initial access bandwidth part according to an exemplary embodiment. The apparatus has a function to implement the above method example. The function can be implemented by hardware or by hardware executing corresponding software. Referring to FIG. 10, the apparatus for configuring the initial access bandwidth part includes a generating module 1001 and a sending module 1002.

The generating module 1001 is configured to generate remaining minimum system information (RMSI), wherein the RMSI includes first configuration information configured to indicate an initial access bandwidth part of a second terminal and second configuration information configured to indicate an initial access bandwidth part of a first terminal, and an access bandwidth capability of the first terminal is lower than an access bandwidth capability of the second terminal:

The sending module 1002 is configured to send the RMSI.

Figure 11:
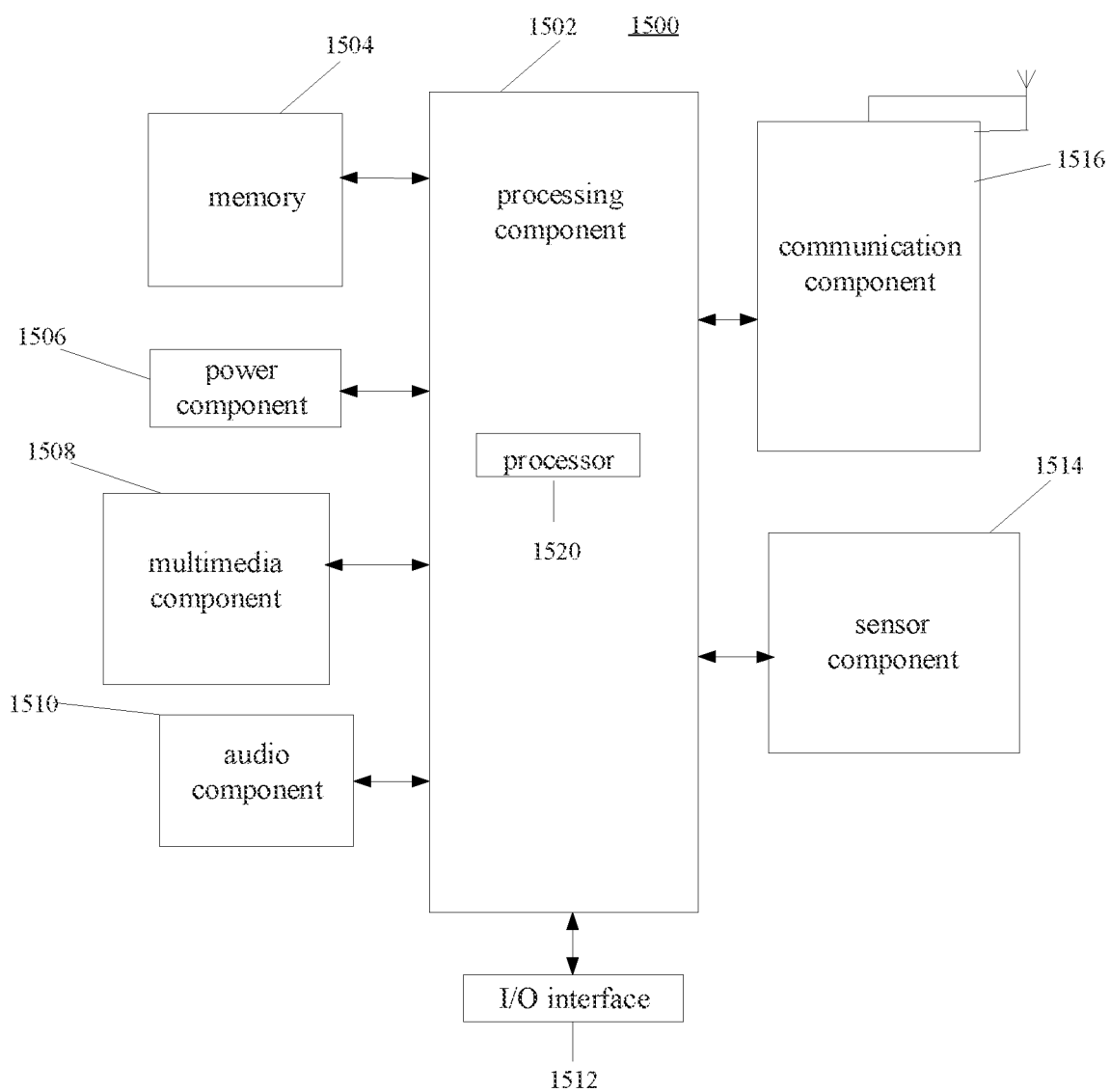
FIG. 11 is a block diagram of an apparatus for determining an initial access bandwidth part according to an exemplary embodiment.

FIG. 11 is a block diagram of an apparatus 1500 for determining an initial access bandwidth part according to an exemplary embodiment. The apparatus 1500 may be the terminal above. Referring to FIG. 11, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the apparatus 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 808 and the processing component 1502.

The memory 1504 is configured to store various types of data to support the operation of the apparatus 1500. Examples of such data include instructions for any disclosures or methods operated on the apparatus 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the apparatus 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the apparatus 1500. For instance, the sensor component 1514 may detect an open/closed status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging disclosures. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the apparatus 1500 and other devices. The apparatus 1500 can access a wireless network based on a communication standard, such as WiFi, 2G, 3G, 4G or 5G, or a combination thereof. In one exemplary embodiment, the communication component 1516 receives a broadcast signal or broadcast associated information from an external broadcast management system via a broadcast channel. Alternatively, the communication component 1516 further includes a near field communication (NFC) module.

In exemplary embodiments, the apparatus 1500 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided anontransitory computer-readable storage medium including instructions, such as included in the memory 1504, executable by the processor 1520 in the apparatus 1500, for performing the above-described methods. For example, the non-transitory computer-readable storage medium may be a ROM, a RAM, a CD-ROM, a magnetic tape, a floppy disc, an optical data storage device, and the like.

Figure 12:
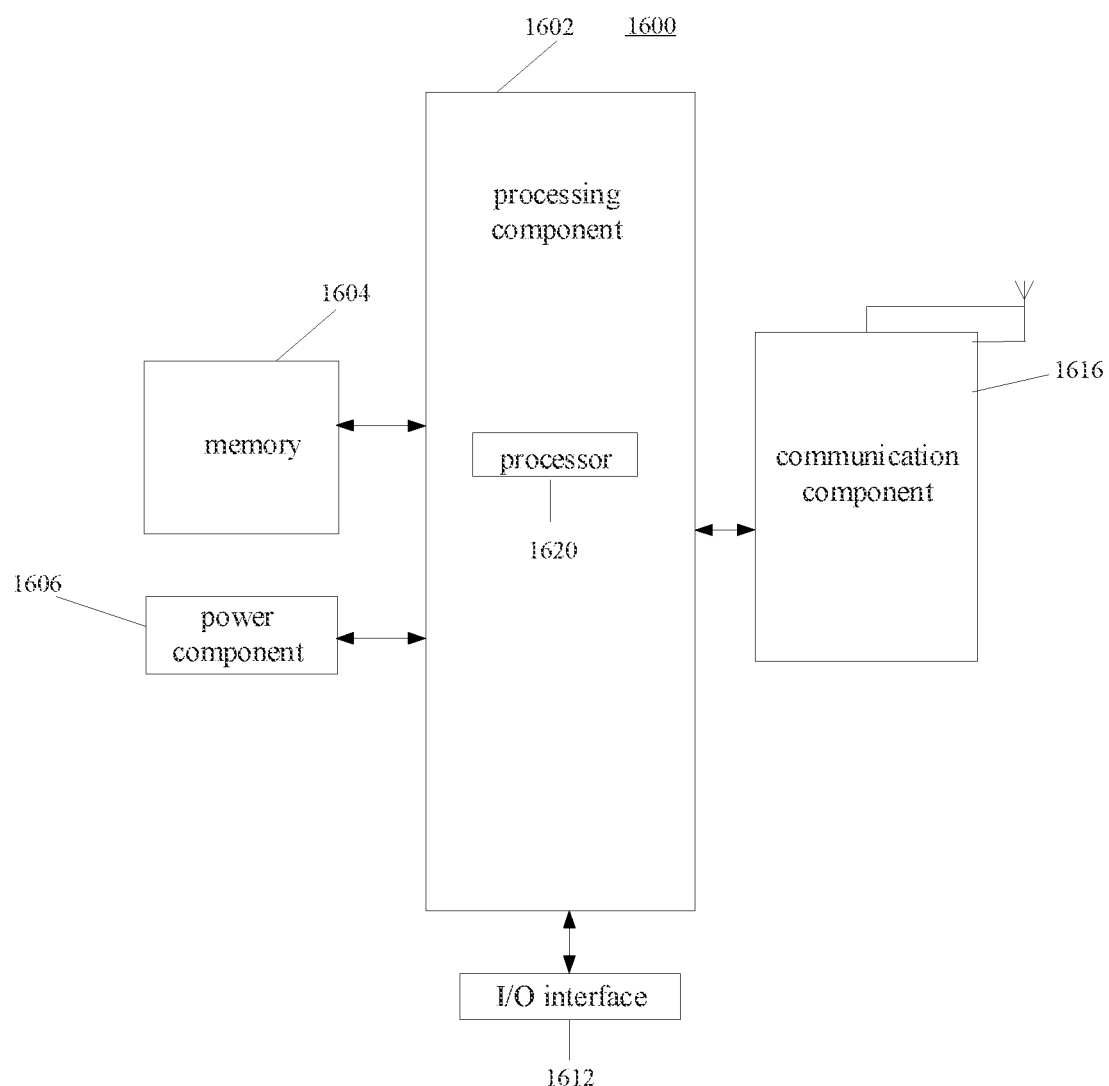
FIG. 12 is a block diagram of an apparatus for determining an initial access bandwidth part according to an exemplary embodiment.

FIG. 12 is a block diagram of an apparatus 1600 for configuring an initial access bandwidth part according to an exemplary embodiment, which may be the aforementioned access network device. Referring to FIG. 12, the apparatus 1600 may include one or more of the following components: processing component 1602, memory 1604, power component 1606, input/output (I/O) interface 1612, and communication component 1616.

The processing component 1602 typically controls the overall operation of the apparatus 1600, such as operations associated with display, telephone call, data communication, camera operation, and recording operations. The processing component 1602 may include one or more processors 1620 to execute instructions to complete all or part of the above described method steps. In addition, the processing component 1602 may include one or more modules to facilitate interactions between the processing component 1602 and other components. For example, the processing component 1602 may include a multimedia module to facilitate interaction between the multimedia component 1608 and the processing component 1602.

The memory 1604 is configured to store various types of data to support operation at the apparatus 1600. The memory 1604 can be realized by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 1606 provides power for various components of the apparatus 1600. The power component 1606 may include a power management system, one or more power supplies, and other components associated with generating, managing, and distributing power for the apparatus 1600.

The I/O interface 1612 provides an interface between the processing component 1602 and the peripheral interface module, which may be a keyboard, click wheel, button, etc. These buttons may include, but are not limited to, the Home button, Volume button, Start button, and Lock button.

The communication component 1616 is configured to facilitate wireless communication between the access network device and other devices. In embodiments of the present disclosure, the communication component 1616 can provide a wireless network based on a communication standard, such as 2G, 3G, 4G or 5G, or a combination thereof, to connect with a terminal device.

In an exemplary embodiment, the apparatus 1600 may be implemented by one or more application specific integrated circuits (ASICs), digital signal processors (DSP), digital signal processing devices (DSPDs), programmable logic devices (PLDs), field programmable gate arrays (FPGAs), controllers, microcontrollers, microprocessors, or other electronic components to perform the above methods.

In an exemplary embodiment, a non-temporary computerreadable storage medium including instructions is also provided, such as a memory 1604 including instructions, which can be executed by the processor 1620 of the apparatus 1600 to perform the method. For example, the non-temporary computer-readable storage medium may be ROM, random access memory (RAM), CD-ROM, tape, floppy disk, optical data storage device, etc.

An exemplary embodiment of the present disclosure also provides a communication system, which includes an access network device and a terminal. The terminal includes the apparatus for configuring the initial access bandwidth part provided by the embodiment shown in FIG. 10 or FIG. 11.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing from the scope thereof.

What is claimed is:

1. A method for determining an initial access bandwidth part, comprising:

determining, by a first terminal, a first initial access bandwidth part based on a first rule, wherein the first initial access bandwidth part does not exceed an access bandwidth capability of the first terminal, the access bandwidth capability of the first terminal is lower than an access bandwidth capability of a second terminal, and the second terminal is a terminal that determines a second initial access bandwidth part based on a second rule according to remaining minimum system information (RMSI), and wherein the first rule and the second rule are not completely identical or are completely different, wherein determining, by the first terminal, the first initial access bandwidth part based on the first rule, comprises:

determining the second initial access bandwidth part according to first configuration information from an access network device; and determining a part of a bandwidth of the second initial access bandwidth part as the first initial access bandwidth part according to the access bandwidth capability of the first terminal.

2. The method of claim 1, wherein determining the part of the bandwidth of the second initial access bandwidth part as the first initial access bandwidth part according to the access bandwidth capability of the first terminal, comprises:

determining a starting frequency position of the second initial access bandwidth part as a starting position of the first initial access bandwidth part, and determining an end position of the first initial access bandwidth part by taking the access bandwidth capability of the first terminal as an offset to the starting frequency position.

3. A first terminal, comprising:
a processor; and
a memory configured to store instructions executable by the processor,
wherein the processor is configured to perform the method of claim 1.

4. A method for determining an initial access bandwidth part, comprising:
determining, by a first terminal, a first initial access bandwidth part based on a first rule, wherein the first initial access bandwidth part does not exceed an access bandwidth capability of the first terminal, the access bandwidth capability of the first terminal is lower than an access bandwidth capability of a second terminal, and the second terminal is a terminal that determines a second initial access bandwidth part based on a second rule according to remaining minimum system information (RMSI), and wherein the first rule and the second rule are not completely identical or are completely different,
wherein determining, by the first terminal, the first initial access bandwidth part based on the first rule, comprises:
determining the second initial access bandwidth part according to first configuration information in the RMSI, wherein the first configuration information is configured to indicate the second initial access bandwidth part of the second terminal; and
determining the first initial access bandwidth part according to a size relationship between the second initial access bandwidth part and the access bandwidth capability of the first terminal.

5. The method of claim 4, wherein determining, by the first terminal, the first initial access bandwidth part based on the first rule, comprises:
in response to the second initial access bandwidth part exceeding the access bandwidth capability of the first terminal, performing at least one of:
determining the first initial access bandwidth part according to configuration information of a control resource set;
determining the first initial access bandwidth part according to second configuration information in the RMSI, wherein the second configuration information is configured to indicate the first initial access bandwidth part of the first terminal; or
determining a part of a bandwidth of the second initial access bandwidth part as the first initial access bandwidth part according to the access bandwidth capability of the first terminal.

6. The method of claim 4, wherein determining, by the first terminal, the first initial access bandwidth part based on the first rule, comprises:
determining the second initial access bandwidth part as the first initial access bandwidth part in response to the second initial access bandwidth part not exceeding the access bandwidth capability of the first terminal.

7. The method of claim 5, wherein determining the first initial access bandwidth part according to the configuration information of the control resource set, comprises at least one of:
determining a frequency resource where the control resource set is located as the first initial access bandwidth part; or
determining a starting frequency position of the frequency resource where the control resource set is located as a starting position of the first initial access bandwidth part, and determining an end position of the first initial access bandwidth part by taking the access bandwidth capability of the first terminal as an offset to the starting frequency position.

8. The method of claim 5, wherein determining the part of the bandwidth of the second initial access bandwidth part as the first initial access bandwidth part according to the access bandwidth capability of the first terminal, comprises:
determining a starting frequency position of the second initial access bandwidth part as a starting position of the first initial access bandwidth part, and determining an end position of the first initial access bandwidth part by taking the access bandwidth capability of the first terminal as an offset to the starting frequency position.

9. A first terminal, comprising:
a processor; and
a memory configured to store instructions executable by the processor,
wherein the processor is configured to perform the method of claim 4.

10. A method for configuring an initial access bandwidth part, comprising:
generating remaining minimum system information (RMSI), wherein the RMSI comprises first configuration information configured to indicate a second initial access bandwidth part of a second terminal and second configuration information configured to indicate a first initial access bandwidth part of a first terminal, and an access bandwidth capability of the first terminal is lower than an access bandwidth capability of the second terminal; and
sending the RMSI,
wherein the first initial access bandwidth part is determined based on a first rule and the second initial access bandwidth part is determined based on a second rule, and wherein the first rule and the second rule are not completely identical or are completely different, and wherein the first initial access bandwidth part does not exceed the access bandwidth capability of the first terminal,
wherein the first rule comprises: the second initial access bandwidth part is determined according to the first configuration information, and a part of a bandwidth of the second initial access bandwidth part is determined as the first initial access bandwidth part according to the access bandwidth capability of the first terminal.

11. An access network device, comprising:
a processor; and
a memory configured to store instructions executable by the processor,
wherein the processor is configured to perform the method of claim 10.

* * * * *